(12) United States Patent
Keenan

(10) Patent No.: US 8,235,632 B2
(45) Date of Patent: Aug. 7, 2012

(54) CARGO BAG VALVE DEFLECTOR

(75) Inventor: Thomas C. Keenan, Brentwood, TN (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 13/049,584

(22) Filed: Mar. 16, 2011

(65) Prior Publication Data

US 2011/0280681 A1   Nov. 17, 2011

Related U.S. Application Data

(60) Provisional application No. 61/334,921, filed on May 14, 2010.

(51) Int. Cl.
*B60P 7/135* (2006.01)
(52) U.S. Cl. .................................................... 410/119
(58) Field of Classification Search ............ 410/119
See application file for complete search history.

(56) References Cited

U.S. PATENT DOCUMENTS

| 3,939,995 | A | | 2/1976 | Baxter |
| 4,073,389 | A | * | 2/1978 | Angarola et al. ............ 410/119 |
| 5,042,541 | A | * | 8/1991 | Krier et al. ................... 141/313 |
| 5,082,244 | A | | 1/1992 | Krier et al. |
| 5,788,438 | A | | 8/1998 | Goshorn et al. |
| 5,871,031 | A | * | 2/1999 | Greinacher ............... 137/599.08 |
| 6,439,259 | B1 | | 8/2002 | Beaver |
| 6,676,042 | B2 | | 1/2004 | Howlett, Jr. et al. |
| 6,823,905 | B1 | | 11/2004 | Smith et al. |
| 6,929,021 | B2 | * | 8/2005 | Cavenagh ..................... 137/223 |
| 7,320,347 | B2 | * | 1/2008 | Ramsey et al. ............... 141/285 |
| 7,610,929 | B2 | | 11/2009 | Zielinski et al. |
| 7,793,687 | B2 | * | 9/2010 | Smith et al. .............. 137/625.22 |
| 2002/0192045 | A1 | * | 12/2002 | Freeman ....................... 410/119 |
| 2003/0111554 | A1 | * | 6/2003 | Howlett et al. ............... 239/509 |
| 2003/0213518 | A1 | * | 11/2003 | Zielinski et al. ............. 137/223 |

OTHER PUBLICATIONS

International Search Report and the Written Opinion of the International Searching Authority issued Aug. 24, 2011, in connection with PCT/US2011/036240.

* cited by examiner

*Primary Examiner* — H Gutman
(74) *Attorney, Agent, or Firm* — Levenfeld Pearlstein, LLC

(57) ABSTRACT

A deflector is configured for use with a cargo bag filling valve. The filling valve has an upstanding portion that extends a distance beyond a surface of the cargo bag. The valve has a diameter and has a compressed gas inlet configured for engagement with a compressed gas inflation nozzle. The deflector has an inclined wall defining a base and an upper portion. The base is defined by an outer periphery of the inclined wall. The inclined wall defines a height. A well is defined at an inner portion, radially inward of the base. The well has a depth that is less than or equal to the height defined by the inclined wall. The well has a bore therein about equal to or slightly less than the diameter of the valve. A flange is formed at an inner periphery of the well.

13 Claims, 5 Drawing Sheets

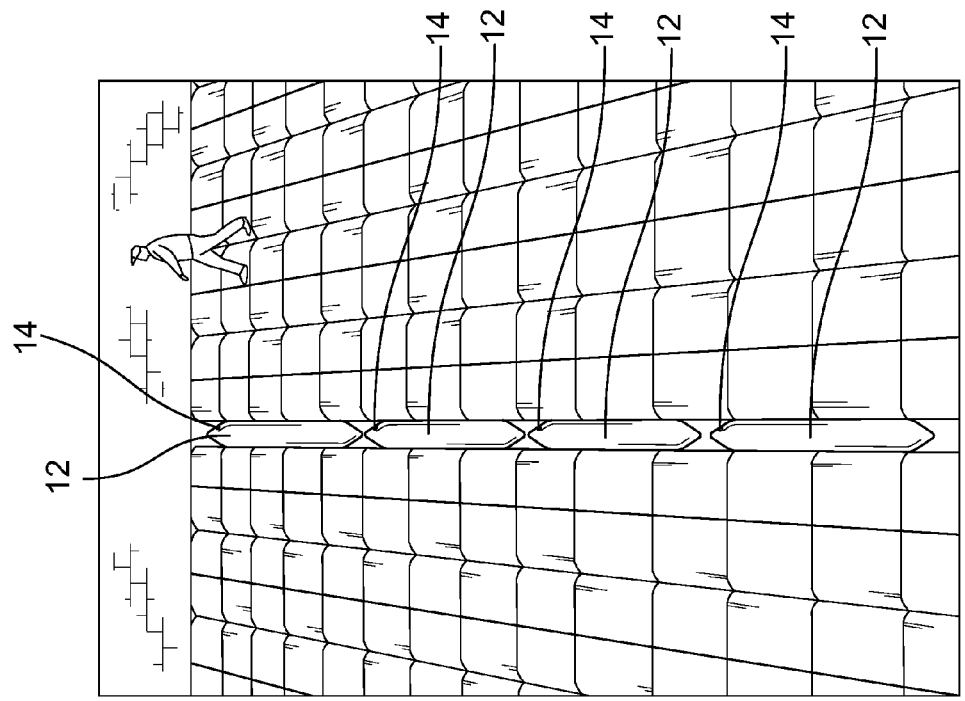
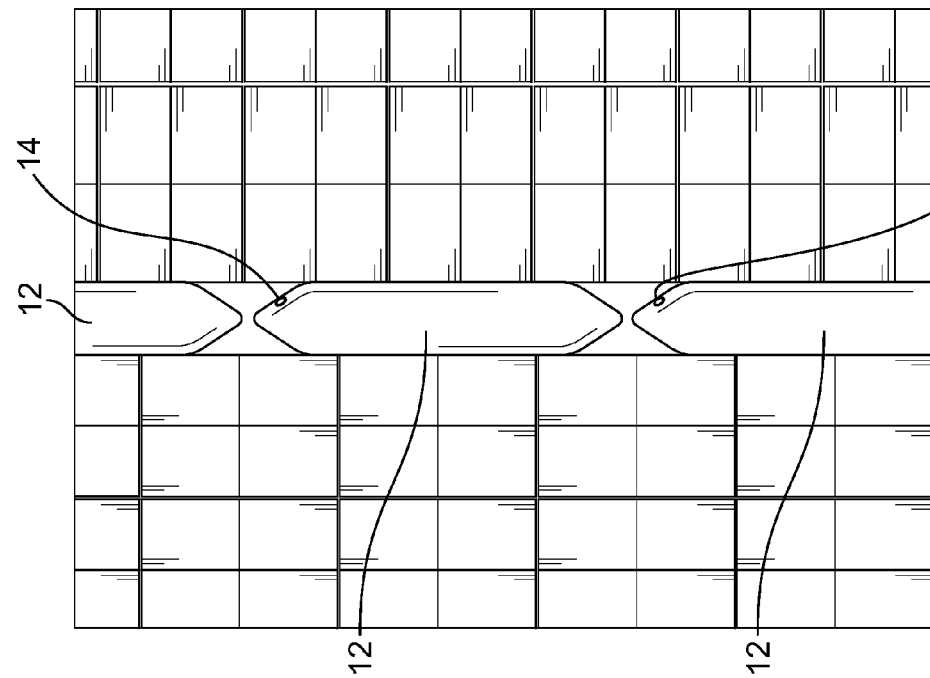
FIG. 2
FIG. 3

CARGO BAG VALVE DEFLECTOR

CROSS REFERENCE TO RELATED APPLICATIONS

This application claims the benefit of U.S. Provisional Application No. 61/334,921, filed May 14, 2010.

FIELD OF THE DISCLOSURE

The present disclosure relates generally to inflatable dunnage air bags, sacks, containers, and the like, and more particularly to a valve deflector for a valve of such inflatable air bags.

BACKGROUND

Cargo or dunnage air bags are used in the cargo shipment or transportation industry as a means for readily and easily securing or bracing cargo within the holds of, for example, railroad cars, ships, airplanes, truck trailers, and the like. Cargo air bags are fabricated from an inflatable bladder that is enclosed within an outer bag or envelope. The outer bag can be made from a variety of materials, for example, a plurality of paper plies or a woven or non-woven polymer, such as polyester and the like.

The air bags are sized to be readily inserted into voids between spaced loads, or between a load and a side or end wall of the cargo container or hold. The bag is subsequently inflated to expand and fill the void. The bag engages the adjacent cargo loads or the cargo load and container wall to secure the cargo loads against undesirable movement during transit.

To achieve the inflation of the cargo or dunnage air bags to a predetermined pressurized level, the air bags are provided with an inflation valve assembly that permits compressed or pressurized air to be introduced into the interior portion of the inflatable bladder. Typically, the inflation valve assembly has a tubular valve body with a sealing flange portion integral with the body. The sealing flange is welded or heat-sealed to an interior wall of the inflatable bladder to form an air-tight seal with the bladder. The tubular valve body projects outwardly from a plane or surface of the air bag to be readily accessible for communication with a suitable gas inflation nozzle or assembly, by which compressed or pressurized gas is introduced to fill the inflatable bladder. However, in this configuration, the valve is susceptible to contact, damage, and in some instances, being sheared from the air bag. This can result in deflation of the air bag and, as such, may allow undesired movement of the cargo.

Accordingly, there is a need for a device or mechanism to protect the cargo air bag valve from damage. Desirably, the device or mechanism would not adversely impact the ability to access the valve to inflate the air bag. Also desirably, the device or mechanism could be readily applied, installed, or coupled to a variety of known valves.

BRIEF SUMMARY

Various embodiments of the present disclosure provide a deflector for use with a cargo bag filling valve. The filling valve has an upstanding portion that extends a distance beyond a surface of the cargo bag. The valve has a diameter and has a compressed gas inlet configured for engagement with a compressed gas inflation nozzle. The deflector has an inclined wall defining a base and an upper portion. The base is defined by an outer periphery of the inclined wall. The inclined wall defines a height. A well is defined at an inner portion, radially inward of the base. The well has a depth less than or equal to the height defined by the inclined wall. The well has a bore therein about equal to or slightly less than the diameter of the valve. A flange is also formed at an inner periphery of the well. The deflector is configured to be positioned over the valve such that the flange engages the upstanding portion of the valve and is secured thereto, the deflector does not interfere with the valve compressed gas inlet, and does not interfere with engagement of the compressed gas inflation nozzle with the compressed gas inlet.

Still other embodiments of the present disclosure provide a cargo bag for placement between loads and/or between a load and a surface. The cargo bag includes a sealed inflatable bladder defining an interior space and an inflation valve mounted to the bladder and providing communication with the interior space. The inflation valve has an upstanding portion extending a distance beyond a surface of the bladder. The inflation valve further has a diameter and a compressed gas inlet configured for engagement with a compressed gas inflation nozzle. The cargo bag also includes a deflector having an inclined wall defining a base and an upper portion. The base is defined by an outer periphery of the inclined wall and the inclined wall defines a height greater than the distance the valve extends beyond the surface of the bladder. The deflector furthering defines a well at an inner portion, radially inward of the base. The well has a depth less than or equal to the height defined by the inclined wall. The well furthering includes a bore therein about equal to or slightly less than the diameter of the valve. In addition, the deflector has a flange formed at an inner periphery of the well. The deflector is positioned over the valve upstanding portion such that the flange engages the valve and is secured thereto. The deflector is positioned so as to not interfere with the valve compressed gas inlet and to not interfere with engagement of the compressed gas inflation nozzle with the valve compressed gas inlet.

In this manner, the present disclosure provides a deflector that protects an inflation valve from damage, such as being sheared from the bag, by contact with an object. The deflector does not adversely impact the ability to access the valve to inflate the air bag. Further, the deflector provides protection that can be readily applied or installed to many known valves.

Other objects, features, and advantages of the disclosure will be apparent from the following description, taken in conjunction with the accompanying sheets of drawings, wherein like numerals refer to like parts, elements, components, steps, and processes.

BRIEF DESCRIPTION OF THE DRAWINGS

FIG. 2 is a plan view illustrating cargo bags in a cargo hold, such as a ship hold;

FIG. 3 is a perspective view similar to FIG. 2;

DETAILED DESCRIPTION

Figure 1:
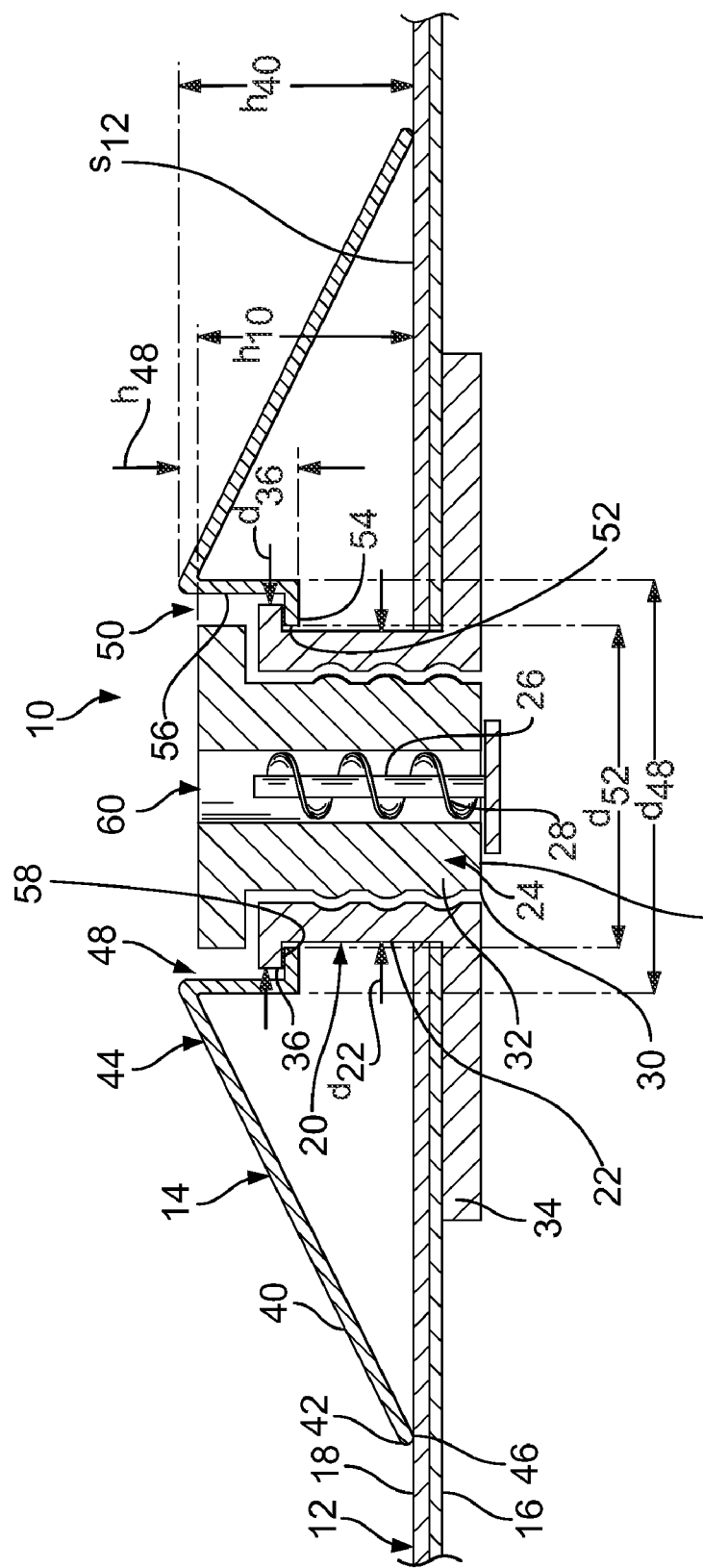
FIG. 1 is a cross-sectional view of a deflector coupled to an inflation valve on a cargo bag in accordance with an embodiment of the present disclosure.
Figure 4:
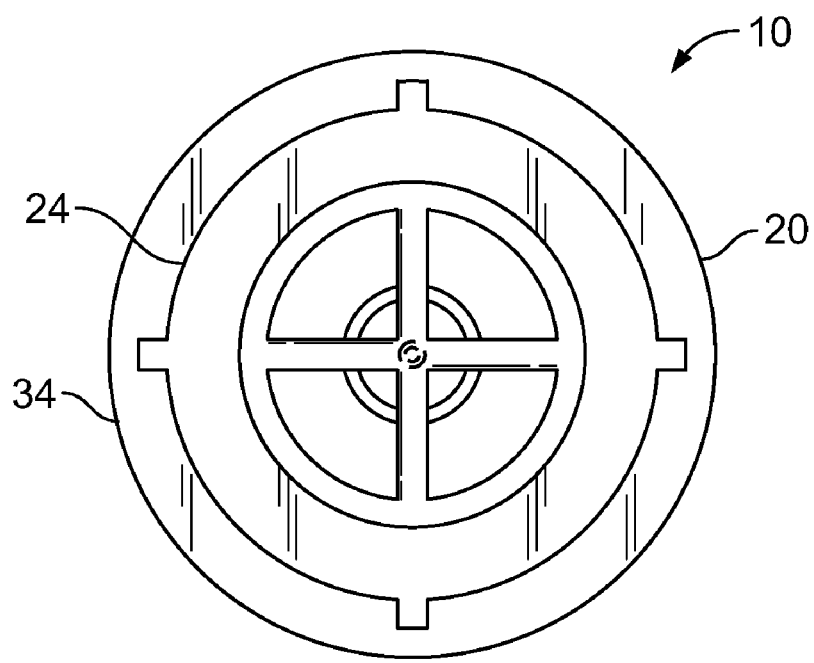
FIG. 4 is a plan view of a typical inflation valve.
Figure 5:
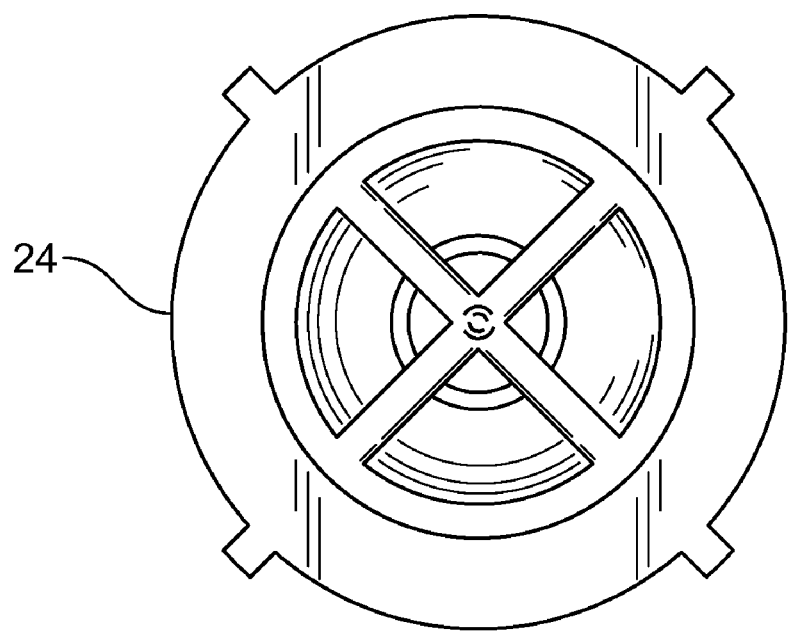
FIG. 5 is a plan view of a male portion of the inflation valve of FIG. 4.
Figure 6:
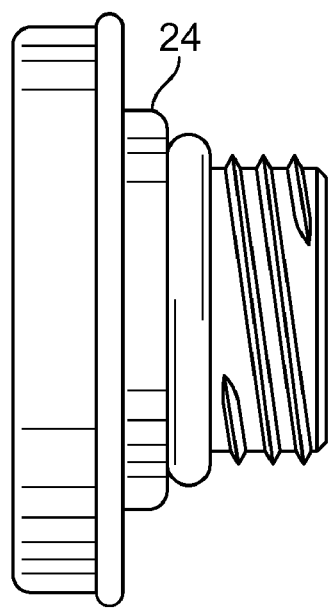
FIG. 6 is a side elevational view of the male portion of FIG. 5.
Figure 7:
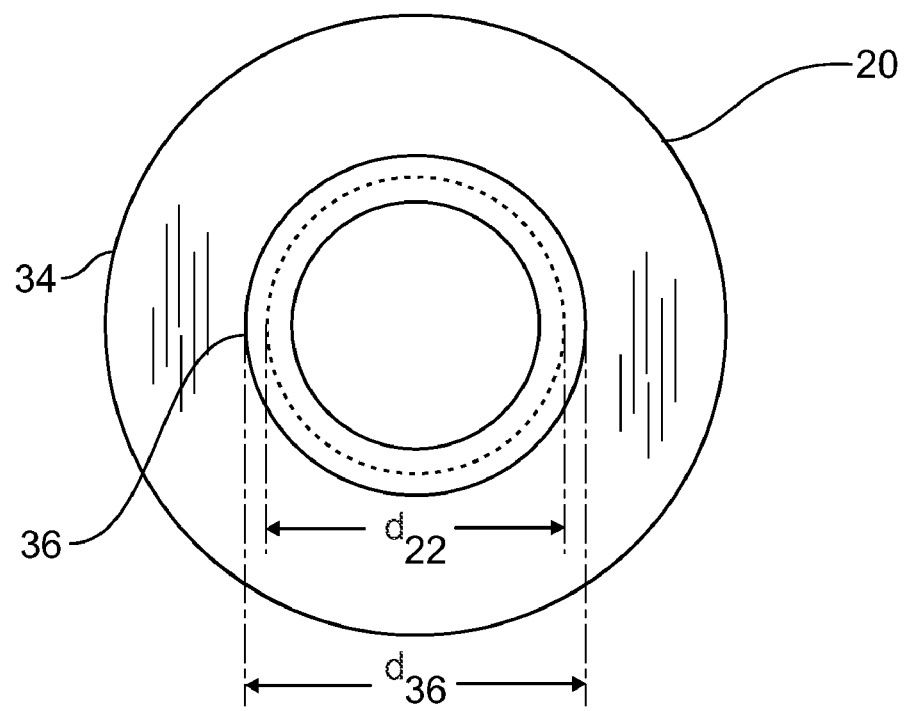
FIG. 7 is a plan view of a female portion of the inflation valve of FIG. 4.
Figure 8:
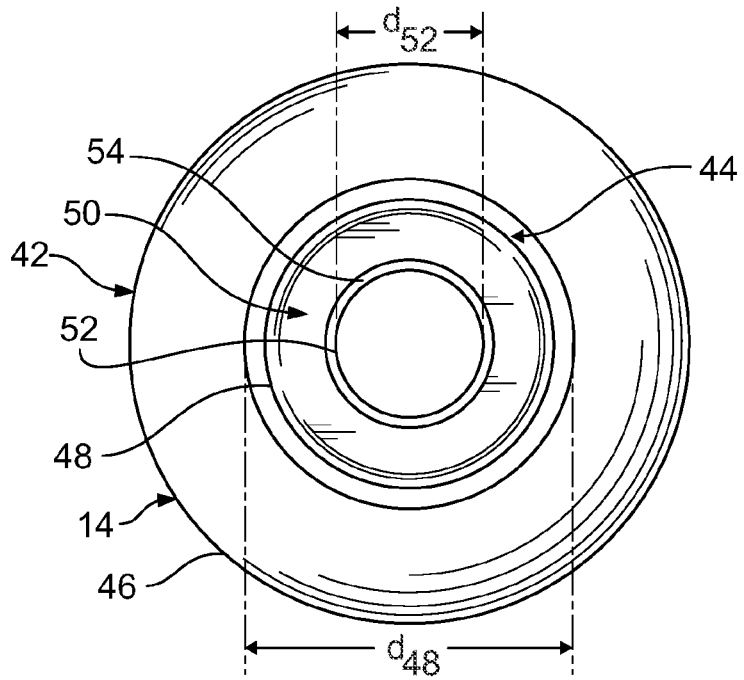
FIG. 8 is a plan view of the deflector of FIG. 1.
Figure 9:
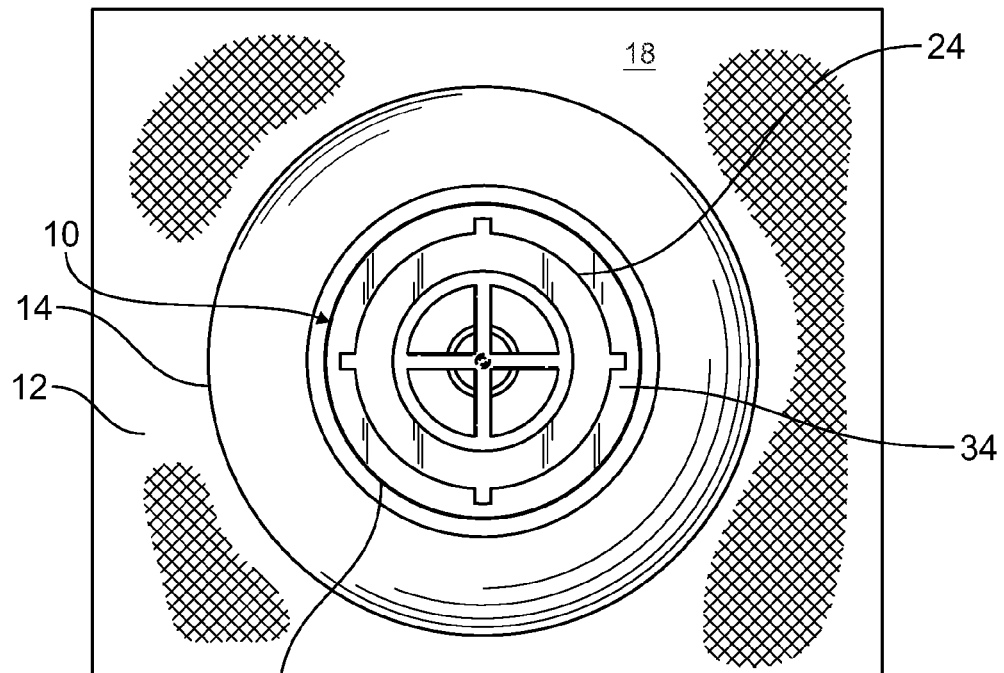
FIG. 9 is a plan view of the deflector of FIG. 1 coupled to an inflation valve on a cargo bag.

While the present disclosure is susceptible of embodiment in various forms, there is shown in the drawings and will hereinafter be described one or more embodiments with the understanding that the present disclosure is to be considered illustrative only and is not intended to limit the disclosure to any specific embodiment described or illustrated. The words "a" or "an" are to be taken to include both the singular and the plural. Conversely, any reference to plural items shall, where appropriate, include the singular.

Referring to the figures and in particular to FIG. 1, there is shown an inflation valve 10 mounted to a cargo bag 12, the valve 10 having a deflector 14 in accordance with an embodiment of the present disclosure. The bag 12 and the valve 10 can be of a known design, including the designs shown in Zielinski et al. U.S. Pat. No. 7,610,929, Smith et al. U.S. Pat. No. 6,823,905, Howlett, Jr. et al. U.S. Pat. No. 6,676,042, and Goshorn et al. U.S. Pat. No. 5,788,438, all of which are incorporated herein by reference. The bag 12 includes an inner sealed air bladder 16 and an outer protective sleeve 18 disposed over the bladder 16. The sleeve 18 can be a generally pliable material formed from a textile, plies of paper, and/or a woven or non-woven material, such as polyester and like.

The valve 10 includes a female portion 20 that is mounted to the bladder 16 by methods that will be recognized by those skilled in the art, such as heat sealing and the like. The female portion 20 has an upstanding portion or receiver 22. A male portion 24 of the valve 10 typically threads into or is otherwise coupled to the female receiver 22. The male portion 24 of the valve 10 contains a valve stem 26 and a spring 28 that returns the valve 10 to a closed position upon disengagement of a filling or inflation nozzle (not shown). A seat 30 is defined by a lower end 32 of the male portion 24. The valve stem 26 engages the seat 30 to seal the valve 10.

Further, the female portion 20 includes a sealing flange 34 that, in the present example, extends outwardly from a first or lower end of the upstanding portion 22. As seen in FIG. 1, for example, the valve 10 can be sealed to the air bladder 16 by the sealing flange 34. The female portion 20 may also include a lip 36 extending outwardly from a second or upper end of the upstanding portion 22.

The female portion 20 of the valve 10 has a diameter $d_{36}$ measured at the lip 36 and a diameter $d_{22}$ measured at the upstanding portion 22, below or adjacent to the lip 36. The valve 10, including the female portion 20 and the male portion 24 (when engaged or coupled together), defines a height $h_{10}$ or distance that the valve 10 extends beyond a plane or surface $s_{12}$ of the bag 12. In accordance with one non-limiting example, the diameter $d_{36}$ is between about 1.25 inches and 1.75 inches (between about 3.17 cm and 4.45 cm), the diameter $d_{22}$ is between about 1.0 inches and 1.25 inches (between about 2.54 cm and 3.18 cm), and the height $h_{10}$ is between about 0.75 inches and 1.25 inches (between about 1.9 cm and 3.18 cm).

As can be appreciated by those skilled in the art, the valve 10, which extends beyond the plane or surface $s_{12}$ of the bag 12 is susceptible to contact, damage, and in certain instances, can be sheared from the bag 12. This may require maintenance to enter the cargo hold to remove, replace, and/or repair the damaged bag 12. When in transit, it may not even be recognized that a valve 10 has been sheared until a destination (e.g., for unloading or inspection) is reached.

The present deflector 14 greatly reduces the opportunity to shear or damage the valve 10. The deflector 14 is formed having an inclined wall 40 that defines a base 42 and an upper portion 44. The base 42 is defined by a lower outer periphery 46 of the inclined wall 40. The inclined wall 40 further defines a height or distance $h_{40}$ that the deflector 14 will extend from the surface $s_{12}$ of the cargo bag 12 when in place. The deflector 14 has a well 48 that is defined at an inner portion 50 of the deflector 14, radially inward of the base 42. The well 48 has a diameter $d_{48}$ and a height $h_{48}$ that is less than or equal to the height $h_{40}$ defined by the inclined wall 40. In accordance with one non-limiting example, the height $h_{40}$ is between about 1.0 inches and 1.5 inches (between about 2.54 cm and 3.81 cm), the diameter $d_{48}$ is between about 1.75 inches and about 2.5 inches (between about 4.44 cm and 6.35 cm), and the height $h_{48}$ is between about 0.5 inches and 0.75 inches (between about 1.27 cm and 1.91 cm).

In the illustrated deflector 14, the well 48 includes a bore 52 defined, in part, by a flange 54 that extends inwardly form an inner periphery or edge 56 of the well. The bore 52 has a diameter $d_{52}$ that is about equal to or slightly less than the largest diameter $d_{22}$, $d_{36}$ of the valve 10. In accordance with one non-limiting example, the diameter $d_{52}$ is between about 0.87 inches and 1.63 inches (between about 2.22 cm and 4.13 cm).

The deflector 14 is configured to be positioned on the valve 10 by urging the bore 52 over or around the female portion 20. More particularly, in the present example, the flange 54 of the deflector 14 is configured to be urged around and under the lip 36 of the female portion 20 to contact a lower surface or underside 58 of the lip 36. In this manner, the deflector 14 is retained on the female portion 20 and the deflector flange 54 does not interfere with inserting and threading the male portion 24 into the female portion 20. Moreover, in this arrangement, the deflector 14 is positioned to not interfere with a valve compressed gas inlet 60 and to not interfere with engagement of a filling or inflation nozzle (not shown) with the compressed gas inlet 60. In addition, the deflector 14 can remain on the female portion 20 even when, for example, the male portion 24 of the valve 10 is removed, as for maintenance or replacement.

It will be appreciated that when the deflector 14 is in place, if a load or other object comes into contact with the deflector 14, the load will be directed or deflected away from the valve 10 (both the male and female portions 24, 20) and the opportunity or chance that the load or an object will contact and damage or shear the valve 10 from the bag 12 is greatly diminished.

The deflector 14 can be made from any of a variety of materials. Preferably, the deflector 14 is of a suitable material that is sufficiently rigid that it does not damage the valve 10, but is sufficiently flexible that it can bend or flex with movement of the cargo bags and objects that contact the deflector 14. Accordingly, it is anticipated that a polymeric or plastic material will be used such polyethylene terephthalate (PET), polypropylene, polyethylene, acrylonitrile butadiene styrene (ABS), and the like. Those skilled in the art will recognize other suitable materials for use for the deflector 14.

Numerous modifications to the present disclosure will be apparent to those skilled in the art in view of the foregoing description. Accordingly, this description is to be construed as illustrative only and is presented for the purpose of enabling those skilled in the art to make and use the invention and to teach the best mode of carrying out same. The exclusive rights to all modifications which come within the scope of the appended claims are reserved.

The invention claimed is:

1. A deflector for use with a cargo bag filling valve, the filling valve having an upstanding portion that extends a distance beyond a surface of the cargo bag, the filling valve having a diameter, and the filling valve having a compressed gas inlet configured for engagement with a compressed gas inflation nozzle, the deflector comprising:

an inclined wall defining a base and an upper portion, the base defined by an outer periphery of the inclined wall, the inclined wall defining a height greater than the distance the valve extends beyond the surface of the bladder;

a well defined at an inner portion, radially inward of the base, the well having a height less than or equal to the height defined by the inclined wall, the well defining a bore therein about equal to or slightly less than the diameter of the valve; and a flange formed at an inner periphery of the well, wherein the deflector is configured to be positioned over the valve such that the flange engages the valve and is secured thereto, the deflector does not interfere with the valve compressed gas inlet, and does not interfere with engagement of the compressed gas inflation nozzle with the valve compressed gas inlet.

2. The deflector of claim 1 wherein the deflector has a truncated conical shape having a truncated portion, the outer periphery of the inclined wall defining a generally circular profile, and the well positioned at the truncated portion.

3. The deflector of claim 2 wherein the deflector is formed from a polymeric material.

4. The deflector of claim 1 wherein the flange extends inwardly from the inner periphery of the well.

5. The deflector of claim 1 wherein the bore has a diameter less than a diameter of the well.

6. A cargo bag for placement between loads or between a load and a surface, comprising:

a sealed inflatable bladder defining an interior space;

an inflation valve mounted to the bladder and providing communication with the interior space, the inflation valve having an upstanding portion extending a distance beyond a surface of the bladder, the inflation valve having a diameter, and having a compressed gas inlet configured for engagement with a compressed gas inflation nozzle; and a deflector, having an inclined wall defining a base and an upper portion, the base defined by an outer periphery of the inclined wall, the inclined wall defining a height greater than the distance the valve extends beyond the surface of the bladder, the deflector defining a well at an inner portion, radially inward of the base, the well having a depth less than or equal to the height defined by the inclined wall, the well having a bore therein about equal to or slightly less than the diameter of the valve, the deflector having a flange formed at an inner periphery of the well, wherein the deflector is positioned over the valve upstanding portion such that the flange engages the valve and is secured thereto, the deflector positioned so as to not interfere with the valve compressed gas inlet, and to not interfere with engagement of the compressed gas inflation nozzle with the valve compressed gas inlet.

7. The cargo bag of claim 6 wherein the valve has a lip extending outwardly of the upstanding portion, and wherein the deflector flange engages an underside of the lip to secure the deflector to the valve.

8. The cargo bag of claim 6 wherein the deflector has a truncated conical shape having a truncated portion, the outer periphery of the inclined wall defining a generally circular profile, and the well positioned at the truncated portion.

9. The cargo bag of claim 8 wherein the deflector is formed from a polymeric material.

10. The cargo bag of claim 6 wherein the inflation valve includes a female portion mounted to the inflatable bladder and a male portion with a gas inlet coupled to the female portion.

11. The cargo bag of claim 10 wherein the female portion includes a sealing flange, an upstanding receiver extending upwardly from the sealing flange, and a lip extending radially outwardly from the upstanding receiver, further wherein the deflector flange engages an underside of the lip to secure the deflector to the valve.

12. The cargo bag of claim 10 wherein the male portion is coupled to the female portion with a threaded engagement.

13. The cargo bag of claim 6 further comprising an outer protective sleeve disposed over the sealed inflatable bladder.

\* \* \* \* \*